D. S. & F. P. F. WILT.
SPRING HORSESHOE.
APPLICATION FILED AUG. 25, 1911.

1,032,097.

Patented July 9, 1912.

Witnesses:
Adelaide Kearns
M. E. Randle

Inventors:
Dorah S. Wilt,
and Frank P. F. Wilt,
By Robert W. Tandle,
Attorney.

COLUMBIA PLANOGRAPH CO., WASHINGTON, D. C.

UNITED STATES PATENT OFFICE.

DORAH S. WILT AND FRANK P. F. WILT, OF RICHMOND, INDIANA, ASSIGNORS OF ONE-THIRD TO CLAYTON E. BELFORD, OF RICHMOND, INDIANA.

SPRING-HORSESHOE.

1,032,097. Specification of Letters Patent. Patented July 9, 1912.

Application filed August 25, 1911. Serial No. 645,962.

*To all whom it may concern:*

Be it known that we, DORAH S. WILT and FRANK P. F. WILT, both citizens of the United States, residing in the city of Richmond, in the county of Wayne and State of Indiana, have invented a new and useful Spring-Horseshoe, of which the following is a full, clear, and comprehensive specification, being such as will enable others to make and use the same with exactitude.

The object of our invention is to provide metal shoes for horses or other animals, which may be applied in the same manner as other horseshoes, but when applied to animals will be hardly distinguishable from ordinary horseshoes, yet be so constructed as to give the highest degree of efficiency when in use and which can be manufactured and sold at a comparatively low price, which need be very little in advance of that of common shoes.

A more particular object is to provide shoes for animals wherein means are provided for absorbing the jar incident to the animal traveling over hard roadways, the shoes being provided with springs which are proportioned according to the animal on which they are to be worn.

Other minor objects and particular advantages of our invention will be brought out in the course of the following specification, and that which is new will be set forth in the appended claim.

One manner for the construction of our invention, and that which in practice we have determined to be the most practical, is shown in the accompanying drawings, in which—

Figure 1:
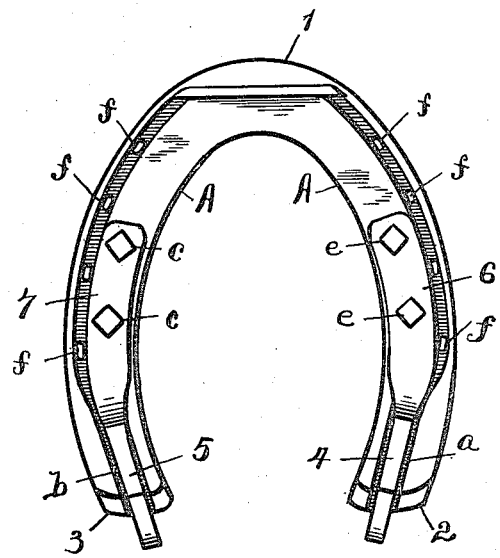
Figure 2:
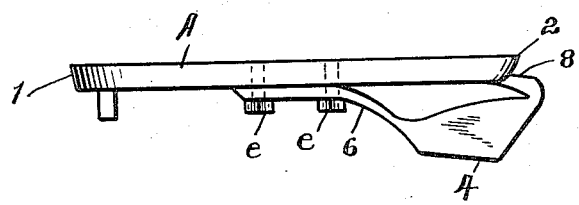
Figure 3:
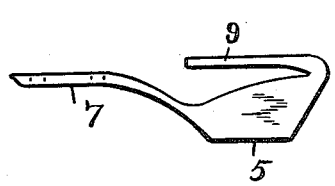
Figure 4:
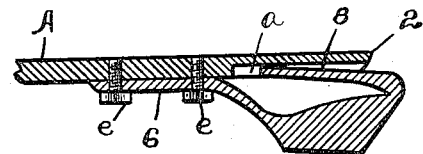
Figure 5:
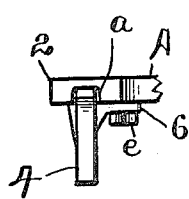

Figure 1 is a plan view of the face or under surface of a shoe constructed in accordance with our invention. Fig. 2 is a side elevation of our invention. Fig. 3 is a side elevation of a spring detached from the shoe. Fig. 4 is a longitudinal section taken through one side of the shoe. And Fig. 5 is an end elevation of one side of the shoe.

Similar indices denote like parts throughout the several views.

In order that the construction and the operation of our invention may be more fully understood we will now take up a detail description thereof, in which we will set forth the invention as briefly and as comprehensively as we may.

Letter A denotes the body-portion of a horseshoe having the toe 1 and the two heel portions 2 and 3. Formed in the face of each heel portion are the respective grooves $a$ and $b$, the same being formed longitudinally of the sides of the shoe, substantially as shown. Two spring members are provided, one for each of the sides of the shoe, the same being made identical with each other, and each comprising a calk, 4 and 5 respectively; each having a spring plate portion, 6 and 7 respectively, extending forward; and each also having a spring tongue portion, 8 and 9 respectively, also extending forward and located underneath the respective calks 4 and 5, and located substantially parallel with said plate portions. Said spring tongues 8 and 9 are adapted to rest in their respective grooves $a$ and $b$, and the spring-plates 6 and 7 are secured to the face of the shoe, each by a pair of screws or bolts $c$—$c$ and $e$—$e$. If desired rivets may be used in place of screws or bolts.

In practice the tongues 8 and 9 do not normally contact flat upon the base of the respective grooves $a$ and $b$, but they are disposed at an angle with relation thereto in order to afford more resiliency when in action. The shoe thus equipped is adapted to be secured to a horse's hoof in the usual manner, driving the nails through the holes $f$. Should the spring members become broken or inoperative through wear or otherwise then they may be removed and replaced.

Horseshoes embodying our invention may be made at a very slight, if any, additional expense, but spring members will absorb the maximum of jar which may be developed by the horse in traveling, thereby adding to the ease and comfort of the animal and preventing damage to the horse.

We desire that it be understood that various changes may be made in the several details of construction without departing from the spirit of our invention or sacrificing any of the advantages thereof.

Having now fully shown and described our invention and the best means for its construction to us known at this time, what we claim and desire to secure by Letters Patent of the United States, is—

A spring horseshoe comprising in combination, a shoe proper having a groove formed centrally in each heel portion and longitudinally thereof, a spring for each heel portion, said springs being secured to the underface of the shoe forward of said grooves and then extending rearward and downward, a tongue formed integral with each of said springs and extending forward at an acute angle from its spring with the free portion thereof located in its respective groove above mentioned, all substantially as shown and described.

In testimony whereof we have hereunto subscribed our names to this specification in the presence of two subscribing witnesses.

DORAH S. WILT.
FRANK P. F. WILT.

Witnesses:
ROBERT W. RANDLE,
R. E. RANDLE.

Copies of this patent may be obtained for five cents each, by addressing the "Commissioner of Patents, Washington, D. C."